United States Patent
Smith

(10) Patent No.: US 11,301,574 B1
(45) Date of Patent: Apr. 12, 2022

(54) CONVERT COMMUNITY DEVICE TO PERSONAL DEVICE

(71) Applicant: Securus Technologies, Inc., Carrollton, TX (US)

(72) Inventor: Matthew R. Smith, McKinney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 193 days.

(21) Appl. No.: 15/850,951

(22) Filed: Dec. 21, 2017

(51) Int. Cl.
  *G06F 21/62* (2013.01)
  *G06Q 20/40* (2012.01)

(52) U.S. Cl.
  CPC ......... *G06F 21/6218* (2013.01); *G06Q 20/40* (2013.01)

(58) Field of Classification Search
  CPC ............. G06F 21/6218; G06F 21/6281; G06F 21/604; G06F 16/173; G06F 21/60; G06Q 20/40; H04L 67/306; H04M 3/42229
  USPC ..................................................... 726/19, 26
  See application file for complete search history.

(56) References Cited

U.S. PATENT DOCUMENTS

| | | | | |
|---|---|---|---|---|
| 9,473,621 | B1* | 10/2016 | Apple | H04M 15/72 |
| 9,817,987 | B2* | 11/2017 | Mityagin | H04L 67/1095 |
| 9,832,313 | B1* | 11/2017 | Way | H04M 3/42059 |
| 9,838,869 | B1* | 12/2017 | Bye | G06Q 20/123 |
| 10,198,586 | B1* | 2/2019 | Keiser | H04L 63/102 |
| 2001/0034703 | A1* | 10/2001 | Picciallo | G07F 7/1008 |
| | | | | 705/39 |
| 2004/0002943 | A1* | 1/2004 | Merrill | H04L 41/0893 |
| 2004/0003079 | A1* | 1/2004 | Aiu | G06F 21/105 |
| | | | | 709/225 |
| 2005/0144641 | A1* | 6/2005 | Lewis | H04N 21/4325 |
| | | | | 725/60 |
| 2006/0123053 | A1* | 6/2006 | Scannell | G06F 16/9577 |
| 2006/0123055 | A1* | 6/2006 | Atkinson | H04L 9/0894 |
| 2008/0044032 | A1* | 2/2008 | Lou | H04L 65/40 |
| | | | | 380/284 |

(Continued)

OTHER PUBLICATIONS

Anton Fedosov et al., SkiAR: Wearable Augmented Reality System for Sharing Personalized Content on Ski Resort Maps, ACM. (Year: 2016).*

(Continued)

*Primary Examiner* — Shanto Abedin
(74) *Attorney, Agent, or Firm* — Fogarty LLP

(57) ABSTRACT

Embodiments disclosed herein provide for systems and methods for converting a community device to a personal device. A personalization option is selected on a portable computing device. A device management server is queried to verify that a specific individual has authorization to personalize the portable computing device. If authorization is confirmed, the portable computing device is configured so that only credentials for the specific individual can be used to access the portable computing device. Authorization may include verifying that the specific individual has sufficient funding and/or verifying that a third party has provided funding for the specific individual. Restricted content is automatically downloaded onto the portable computing device as part of or following the personalization process. A first set of basic applications may be available to any user prior to personalization, and after personalization a second set of applications, which are only available on a personalized device, are downloaded.

16 Claims, 5 Drawing Sheets

(56) References Cited

U.S. PATENT DOCUMENTS

| | | | | |
|---|---|---|---|---|
| 2008/0057947 | A1* | 3/2008 | Marolia | H04L 67/34 455/425 |
| 2008/0109528 | A1* | 5/2008 | Knight | G06F 8/71 709/217 |
| 2008/0134297 | A1* | 6/2008 | Clinick | G11B 20/00166 726/4 |
| 2009/0070412 | A1* | 3/2009 | D'Angelo | H04L 67/306 709/203 |
| 2009/0150400 | A1* | 6/2009 | Abu-Hakima | G06F 16/951 |
| 2009/0210304 | A1* | 8/2009 | Loveman | G06Q 30/02 705/14.41 |
| 2010/0235881 | A1* | 9/2010 | Liu | G06F 9/545 726/3 |
| 2011/0086611 | A1* | 4/2011 | Klein | H04M 15/00 455/407 |
| 2011/0237222 | A1* | 9/2011 | Niejadlik | H04M 3/38 455/411 |
| 2012/0032945 | A1* | 2/2012 | Dare | G06F 3/0481 345/418 |
| 2012/0129452 | A1* | 5/2012 | Koh | G06Q 20/352 455/41.1 |
| 2013/0160141 | A1* | 6/2013 | Tseng | G06F 21/31 726/28 |
| 2013/0282567 | A1* | 10/2013 | Bacastow | G06Q 20/3223 705/39 |
| 2015/0254457 | A1* | 9/2015 | Wade | G06F 21/53 726/1 |
| 2015/0312608 | A1* | 10/2015 | Higa | H04N 21/4668 725/13 |
| 2016/0028676 | A1* | 1/2016 | Harper | G06Q 30/0601 709/206 |
| 2016/0119358 | A1* | 4/2016 | Laadan | H04L 63/102 726/28 |
| 2016/0127378 | A1* | 5/2016 | Gupta | G06F 21/6218 726/4 |
| 2018/0012038 | A1* | 1/2018 | Papakipos | G06F 21/31 |

OTHER PUBLICATIONS

Dongsong Zhang, Delivery of personalized and adaptive content to mobile devices: a framework and enabling technology, Communications of the Association for Information System. (Year: 2003).*

* cited by examiner

CONVERT COMMUNITY DEVICE TO PERSONAL DEVICE

BACKGROUND

Correctional departments responsible for incarcerating inmates continue to develop methods and activities to rehabilitate the inmates for their subsequent release back into society. One aspect thought to aid in that transition is communication. By allowing prisoners to have some contact with friends and family while incarcerated, the justice system aims to facilitate their transition back into society upon release. Traditional forms of contact include telephone calls, in-person visitation, video visitation, etc. More recently, technological advances have allowed jails and prisons to provide other types of visitation, including individual-to-individual videoconferences and online chat sessions.

Other activities that aid in rehabilitation include educational and worker training programs. A correctional facility may allow inmates to access educational and training programs so that inmates can gain skills to prepare for career opportunities upon release. With these skills, the inmates may more easily access jobs, which can reduce the likelihood that the inmates will commit further criminal activity and become incarcerated again.

Correctional facilities have traditionally had limited communication and educational facilities due to considerations such as cost and security concerns. Communications with friends and family and access to educational and training programs can be facilitated using a portable device, such as a tablet or laptop computer. For example, inmates may use a tablet provided by the correctional facility to access communication and educational applications. Such portable devices allow the inmate more opportunities to contact friends and family and to use education and training courses without also requiring the correctional facility to move the inmate to a telephone area or classroom.

SUMMARY

Embodiments disclosed herein provide for systems and methods for converting a community device to a personal device. Example methods comprise detecting selection of a personalization option on a portable computing device; querying a device management server to verify that a specific individual has authorization to personalize the portable computing device; if authorization is confirmed, configuring the portable computing device so that only credentials for the specific individual can be used to access the portable computing device; and automatically downloading restricted content onto the portable computing device. The authorization may comprise verifying that the specific individual has sufficient funding and/or verifying that a third party has provided funding for the specific individual.

Prior to selection of the personalization option, a first set of basic applications may be made available to any user of the portable computing device, and after selection of the personalization option, the automatically downloaded restricted content comprises a second set of applications that are only available on a personalized portable computing device. The restricted content may comprise one or more of communication software applications and entertainment software applications.

After selection of the personalization option, the portable computing device may be further configured to store content that was blocked prior to personalization of the device. The blocked content may include, for example, one or more of music, video, games, images, and messages.

In a further embodiment, an example method comprises operating at least one computer system comprising: checking out a shared media device to a user; receiving a request to personalize the shared media device; verifying that the user has authorization to personalize the portable computing device; configuring records for the shared media device so that only users with authorized credentials can access the shared media device; and automatically downloading restricted content to the shared computing device. The authorized credentials that can access the shared media device are credentials for the user, for example.

A device management server may be used to control access to a first set of shared media devices that are available to be checked out to anyone in a group of users and to a second set of shared media devices that each are restricted to a specific user. Individual ones of the first set of shared media devices become part of the second set of devices when a user purchases a device or purchases exclusive use of a device.

The shared media device may be personalized by limiting access to the shared media device to the user; and allowing the shared media device to be used for communications and/or entertainment only after personalization. The communications may include, for example, telephone calls, video visitation, text messages, email messages, and chat messages. The entertainment may include, for example, downloading, accessing, saving, or streaming movies, videos, images, music, podcasts, books, or other content.

An example system comprises a computer system comprising at least one processor and a memory coupled to the at least one processor, the memory storing program instructions executable by the at least one processor to cause the computer system to: enable a shared media device to present a personalization option on a user interface; upon selection of the personalization option by the user, enable the shared media device to verify that a specific user has authorization to personalize the device; if authorization is confirmed, enabling the shared media device to limit access so that only credentials for the user can be used to access the shared media device; and enable automatic download of additional content onto the shared media device. The authorization may comprise verifying that the user has sufficient funding or verifying that a third party has provided funding for the user. After selection of the personalization option, the automatically downloaded additional content may comprise a second set of applications that are only available on a personalized portable computing device. The additional content may comprise one or more of communication software applications and entertainment software applications.

The foregoing has outlined rather broadly some features and technical advantages of some embodiments disclosed herein in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The features of some embodiments, together with some objects and advantages will be better understood from the following description when considered in connection with the accompanying figures. It is to be expressly understood, however, that each of the figures is provided for illustration and description only and is not intended as a definition of the limits of the present invention.

BRIEF DESCRIPTION OF THE DRAWINGS

Reference will now be made to the accompanying drawings, wherein.

Figure 1:
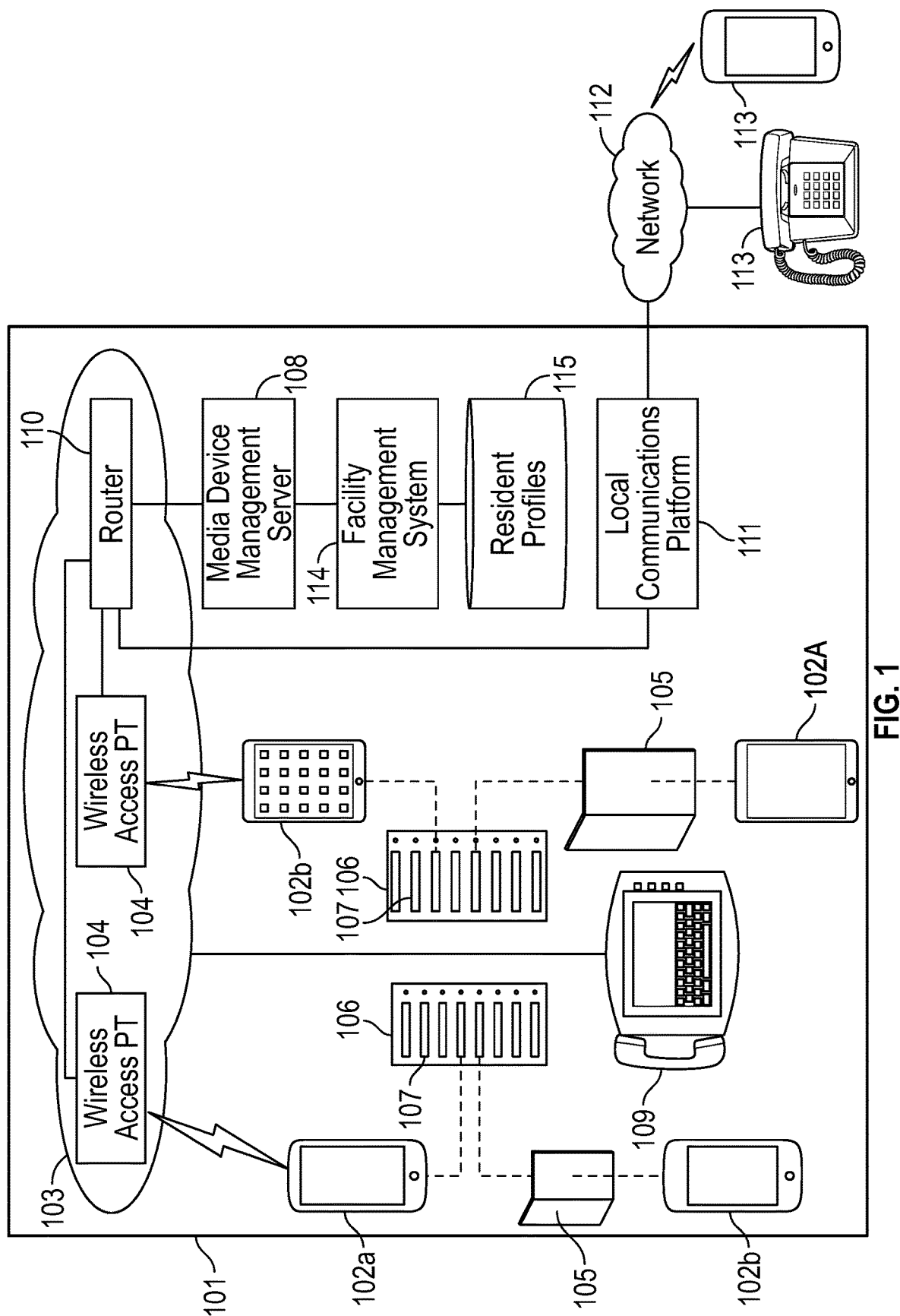
FIG. 1 is a diagrammatic illustration of an example shared media device environment in accordance with an example embodiment.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims.

DETAILED DESCRIPTION

Some embodiments now will be described more fully hereinafter with reference to the accompanying drawings. Embodiments may take many different forms, and this disclosure should not be construed as limited to the embodiments set forth herein. Rather, these embodiments are provided so that this disclosure will be thorough and complete, and will fully convey the scope of the invention to those skilled in the art. One skilled in the art may be able to use the various embodiments.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

This specification discloses systems and methods for providing portable media devices, such as tablet or laptop computers, smartphones, personal digital assistants, or similar portable or mobile communication and computing devices, that are shared among multiple users. In one embodiment, the portable media devices are provided to residents in a controlled-environment facility. Generally, a resident of the controlled-environment facility may temporarily access a portable media device for personal use, such as to view downloadable or streaming media content, communicate with another person, participate in educational or training programs, or other activities. The resident may be required to undergo some reservation and/or check-out process to access a portable media device from a group of community devices that are available to a large group of residents. Because they are shared among different residents, the community media devices are not personalized for individual users. For example, users may be restricted from modifying the community devices physically (e.g., no marking or signing the device, no adding a case, etc.) and/or electronically (e.g., new applications cannot be downloaded, existing applications cannot be personalized, etc.). Instead, the community media devices offer a predetermined set of applications that any resident currently holding the tablet can use. When the user is finished with the device, such as after completing a call or training course or after a preset duration, the community media device must then be returned FIG. 1 is a diagrammatic illustration of an example shared media device environment in accordance with an example embodiment. The shared media device environment allows a facility to control access to portable media devices that are shared among multiple persons, such as multiple residents of a controlled-environment facility. Other embodiments may be applied in other environments and contexts.

Any number of residents may reside in controlled-environment facility 101 and use media devices 102 (e.g., 102a, 102b). Media devices 102 may be, for example, computer systems such as tablet computing devices, smartphones, media players, or the like. In some embodiments, each media device 102 may be adapted specifically for use in a corresponding controlled-environment facility 101. For example, in a correctional facility such as a jail or prison, a media device 102 may be "stripped-down" from the standpoint of which application programs (apps) are provided on or allowed to run on the media device 102. The media device may be adapted to only connect to a network 103 that is controlled by controlled-environment facility 101 and/or in only certain locations within the facility 101. Controlled-environment facility network 103 may be a Wireless Local Area Network (WLAN) (e.g., a network using the IEEE 802.11 or 802.16 standards) that can be accessed only in certain areas where a wireless access point 104 is available.

The media devices 102a may have a limited selection of pre-installed applications and installation of additional applications on device 102a may be forbidden. For example, modifications to the device's operating system may prevent loading of additional applications and/or facility administrator permission may be required to load additional applications. The limited set of applications provided on a media device 102a might include any apps of interest to residents of the controlled-environment facility 101. For example, a media device 102a provided to inmates of a correctional facility might include applications providing access to a legal research service, employment search, educational courses, entertainment, and/or the like. Also, media devices 102a may be used to communicate with others, such as through telephone calls, video calls, emails, instant messaging, video or text chat, and/or the like. These limited capability or generic media devices may be referred to as "community devices." The community media devices 102a are available for use by any authorized resident. Other ones of the media devices 102b are owned by, or dedicated for use by, a specific resident (e.g., "personal devices"). The individual media devices may be identified, for example, by a unique identifier such as a Media Access Control (MAC) address, an identifier programmed in the device 102, an identifier generated by an application running on the device 102, and/or other identifiers.

In some examples, one or more of the media devices 102 are disposed in a housing 105, such as a clamshell case, a cartridge, or the like. A housing 105 may provide physical protection for media device 102 and/or can provide a coupling between a port on media device 102 and a port to which the media device 102 and/or housing 105 may be coupled for power charging and/or network connections.

One or more docking or charging stations 106 are provided for the media devices 102. Docking stations 106 comprise one or more docking slots 107, wherein each docking slot 107 is adapted to receive one media device 102 with or without a housing 105. Docking stations 106 provide a means for recharging media devices 102 and a location for storage when not in use.

The media devices 102 and/or docking stations 107 may be operatively coupled to media device management server 108 via network 103. Media device management server 108 monitors the status of each media device 102 and provides authentication and/or authorization services to media devices 102. Authentication services may include, for example, verifying or authenticating a particular user to ensure he or she is who they claim to be. Authentication may be performed using a Personal Identification Number (PIN), voice recognition, fingerprint, iris recognition, facial recognition, key pad, touchpad, touch screen, or other biometric, non-biometric, or other authentication methods. For example, a PIN can be entered in any number of ways, which may incorporate biometric verification with the entering of the PIN itself. For example, the PIN may be entered using a touchscreen, such that fingerprint recognition can be used to verify the typing party's identity. Alternatively, the PIN may be spoken to be entered, and speech recognition may be used to recognize the spoken numbers of the PIN and/or used on the spoken PIN to verify the speaker's identity. Further, an image of the user may be captured during such PIN entry and facial recognition may be used to confirm the identity of the user, such as for correlation with the PIN. Authorization may include, for example, verifying that the user is approved to—and/or not restricted from—using or purchasing a media device 102, such as by querying a facility management system 114 and/or a resident profile database 115 for appropriate permission. Media device management server 108 also tracks which media devices 102a are available to community residents and which are personal devices 102b that are assigned to a specific user.

In addition to media device 102, the controlled-environment facility 101 may provide a kiosk or terminal 109 that further includes video and/or telephone capabilities. For example, kiosk 109 may include a personal computer, a laptop computer, a tablet computing device, a video phone computer system, and/or the like. The kiosk 109 can be employed in a manner similar to media device 102 to provide a media solution for residents as well as communication services, and/or the like. Kiosk 109 may be operatively coupled to controlled-environment facility network 103.

The docking stations 106 may be operatively coupled to controlled-environment facility network 103, media device management server 108, and/or kiosk 109. For example, the docking slots 107 may be connected, such as via a proprietary interface, USB, Ethernet, etc., and/or wireless connectivity (e.g., Wi-Fi, inductive connectivity, near field communications, Bluetooth, etc.), to network 103 and/or kiosk 109. Such connectivity may provide two-way communication between each media device 102 and media device management server 108, and/or kiosk 109 via the respective charging slot 107.

Media devices 102 may connect to wireless access point 104, which provides access to controlled-environment facility network 103. Router 110 in network 103 is communicatively coupled to a local communications platform 111, which provides communication services with external networks 112 outside controlled-environment facility 101. Residents may communicate (e.g., telephone calls, texts, etc.) with their friends, family, or attorneys at remote communication devices 113 by connecting to external networks 112 using applications on media device 102 or kiosk 109.

Various modifications may be made to the system illustrated in FIG. 1. For example, various devices and/or functionality described herein may be local to or remote from the controlled-environment facility 101. Further, functionality can be distributed across multiple devices in various locations. Additionally, connections between devices may be in different configurations, and networks may be implemented to communicatively couple various devices in many different configurations.

In other examples, the docking/charging stations 106 may be omitted. For example, one or more charging stations may be configured to charge the media devices 102 when the media devices 102 are near the charging table(s).

A resident may be permitted to check out any community media device 102a that is available for checking out, such as a device 102a charging in a docking station 106. The resident may have authority to check out independently or check out may require facility personnel to authorize check out. In some embodiments, the resident may request to check out a community media device 102a using kiosk 109. For example, the resident may log into the kiosk 109 and request to check out a media device 102a. The media device management server 108 may be queried to determine whether any community media device 102a is available for checking out and/or whether the resident is permitted to check out a community media device 102a. If a community media device 102a is available for check out, the media device management server 108 can communicate back to the kiosk 109 to identify which media device 102a is available, such as by indicating a docking station 106 and slot number 107 corresponding to the available media device 102a.

Alternatively, any community media device 102a present in a docking station 106 may be available for use on a first come first served basis.

Once a community media device 102a is selected, the resident can log in to the device 102a via wireless access through the wireless access point 104. The resident may have an assigned account that is used to control resident access and to track resident device usage. For example, a facility management system 114, such as a jail management system (JMS) or a law enforcement agency management system (AMS), may be used to manage residents and staff associated with the controlled-environment facility 101. Facility management system 114 has a resident profile database 115 comprising resident data, such as media device account information. When the resident attempts to log in to the community media device 102, the device authenticates the resident's access with media device management server 108, which verifies the account with facility management system 114 and/or resident profile database 115.

If a resident attempts to log in to a personal media device 102 that is not available for community check out, such as a personal media device 102b or other restricted device, then media device management server 108 will prohibit the log in and the personal media device 102b will be disabled.

In other embodiments, to determine if a community media device 102a is available for check out, a resident may take a media device 102a from a corresponding docking station 106 and attempt to log in to the device 102a using an account maintained at media device management server 108, facility management system 114, or resident profile database 115. If the community media device 102a is available for checking out, the act of logging into the media device 102a itself can act to check out the device 105a. If selected media device 102a is not available for checking out, or if a personal device 102b is selected, the media device management server 108 will prohibit the resident from logging into the device, which will remain disabled.

In further examples, kiosk 109 may include a scanner, such as a bar code scanner, near field communication scanner, radio frequency identification (RFID) scanner, Bluetooth scanner, or other scanner. A resident may check out a media device 102 by scanning the media device 102 and/or housing 105 with the scanner. When the scanner scans the media device 102 and/or housing 105, kiosk 109 notifies media device management server 108 that the resident has checked out the media device 102.

When a resident has finished using a community media device 102a, the device 102a may be checked in by inserting the device 102a into a docking station 106 charging slot 107 or scanning the device 102a at kiosk 109. The docking station 106 is configured to detect when a device 102 is inserted in charging slot 107. When the docking station 106 detects that media device 102a is disposed in a charging slot 107, the respective community media device 102a will be checked in with media device management server 108.

Although not illustrated in FIG. 1, an administrator may log into media device management server 108 to identify which media devices 102 are checked out and to which account/resident. Further, the administrator may be able to, via media device management server 108, remotely disable one or more media devices 102 and/or force a log-out from one or more media devices 102.

Further, if a resident fails to check-in a media device 102 after some predefined duration, media device management server 108 can send an alert or notification to an administrator and/or other authorized personnel to indicate that the media device 102 remains checked out. The media device management server 108 can also send a location of the media device 105 to the administrator and/or authorized personnel, such as a GPS location, which may be enabled by a GPS position system within the media device 102.

In one embodiment, community media devices 102a and personal media devices 102b have the same hardware configuration, but differ in available software application content. For example, community media devices 102a may include a pre-installed limited selection of applications, such as applications that are free to use but lack premium or fee-based content. On the other hand, personal media devices 102b may have both the pre-installed limited selection of free to use applications, in addition to premium and fee-based content. Personal media devices 102b and/or the content loaded on device 102b may require a one-time purchase, a renewable subscription, an event-based fee (e.g., per download, per log in, per search, etc.), or other charges for use. Residents with personal media devices 102b are able to keep the device permanently—or as long as a rental fee is paid—and do not have to return the device 102b to a common stock or library of devices. This allows a resident to configure a personal media device 102b in any way desired, such as by loading additional applications, deleting preloaded applications, saving content (e.g., purchased music, video, games, courses, etc.), saving configurations, etc. To obtain or purchase a personal media device 102b, a resident must have authorization and/or funding. Resident profile database 115 may include records of each resident's funding accounts (e.g., prepaid calling accounts, trust accounts, commissary accounts, etc.), which would indicate that the resident has approval to have a personal media device 102b.

The community media devices 102a are shared among a group of residents and are returned to a common stock when a resident has finished using the device 102a. Some configurations may limit the use of a community media devices 102a to a preset duration during any one session. The community media devices 102a may be configured with content requiring a minimum level of access and authorization. Furthermore, in some embodiments, community media devices 102a may not require a resident to have an established funding account to use the preloaded applications. This allows any resident to use any available community media device 102a and to evaluate whether the resident should obtain their own personal media device 102b. However, residents using community media devices 102a cannot save content, configurations, or other personalized settings on the devices 102a.

In one embodiment, a resident selects a community media device 102a and logs in to use and evaluate the device. The resident may use any preloaded application, but cannot save downloaded content, configurations, bookmarks, searches, or select other personalized features since another resident will use the same community media device 102a next. However, while using the community media device 102a, the resident may decide to keep the device as a personal media device 102b. The user interface on the community media device 102a includes a personalization option (e.g., button, tile, application, etc.) that the resident can select to immediately and automatically convert the community media device 102a to a personal media device 102b.

Figure 2A:
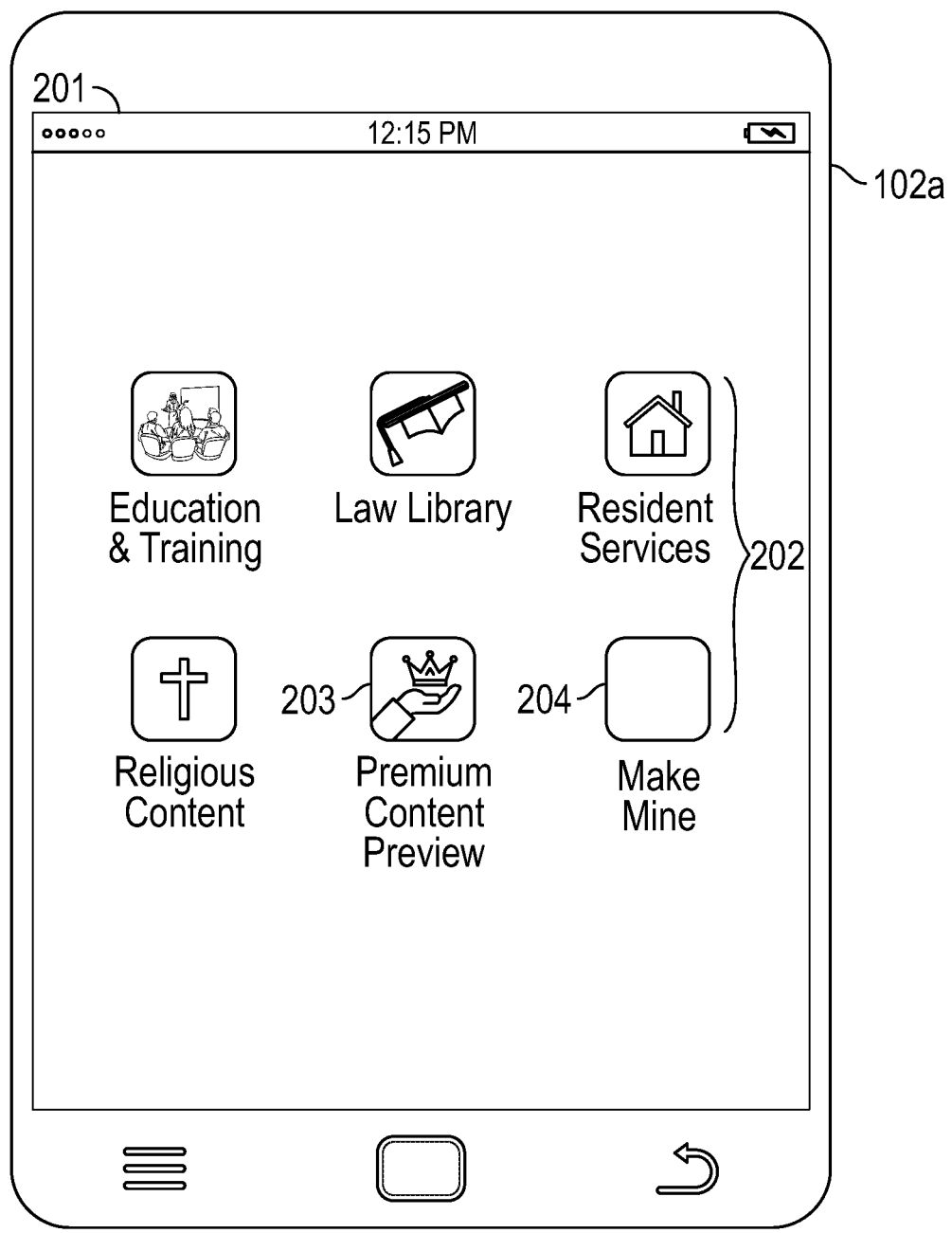
FIG. 2A illustrates an example embodiment of a community media device.

FIG. 2A illustrates an example embodiment of a community media device 102a, such as a tablet computer with a user interface/display screen 201 that allows a resident to access applications or other software via buttons, tiles, or icons 202. Community media device 102a is preloaded with a small number of applications, such as education, research, resident services, and religious content applications. Community media device 102a allows any resident to access these basic services. In addition, community media device 102a may provide a preview (203) of premium content and options that are available on personalized media devices. If a resident using community media device 102a decides that he or she wants a personal device, the resident can select the "make mine" personalization button (204), which will initiate a personalization application.

When the personalization application is started, it will first verify that the resident has funding for a personalized media device. This may require that a friend or family member had previously paid for a personal media device for the resident or that the resident otherwise had sufficient funds. The funding may represent an amount required to purchase the media device or to pay a subscription or recurring fee (e.g., a monthly fee) to permit dedicated use of the media device. The resident will have already logged on to the community media device 102a or the personalization application will require the resident to log on or otherwise provide identifying information. The personalization application may then query the media device management server to verify that the resident is already approved or has funding for a personal community media device. The media device management server may further query the facility management system, resident profile database, or other resident fund management application to verify that media device funding is available and approved.

If funding is not available, then the personalization application may allow the resident to identify a friend or family member to be contacted to set up the appropriate funding. Until funding is approved, the community media device 102a continues to operate with limited functionality. However, if funding is available or obtained by the personalization application, then the device will immediately be converted to a personal media device 102b.

Figure 2B:
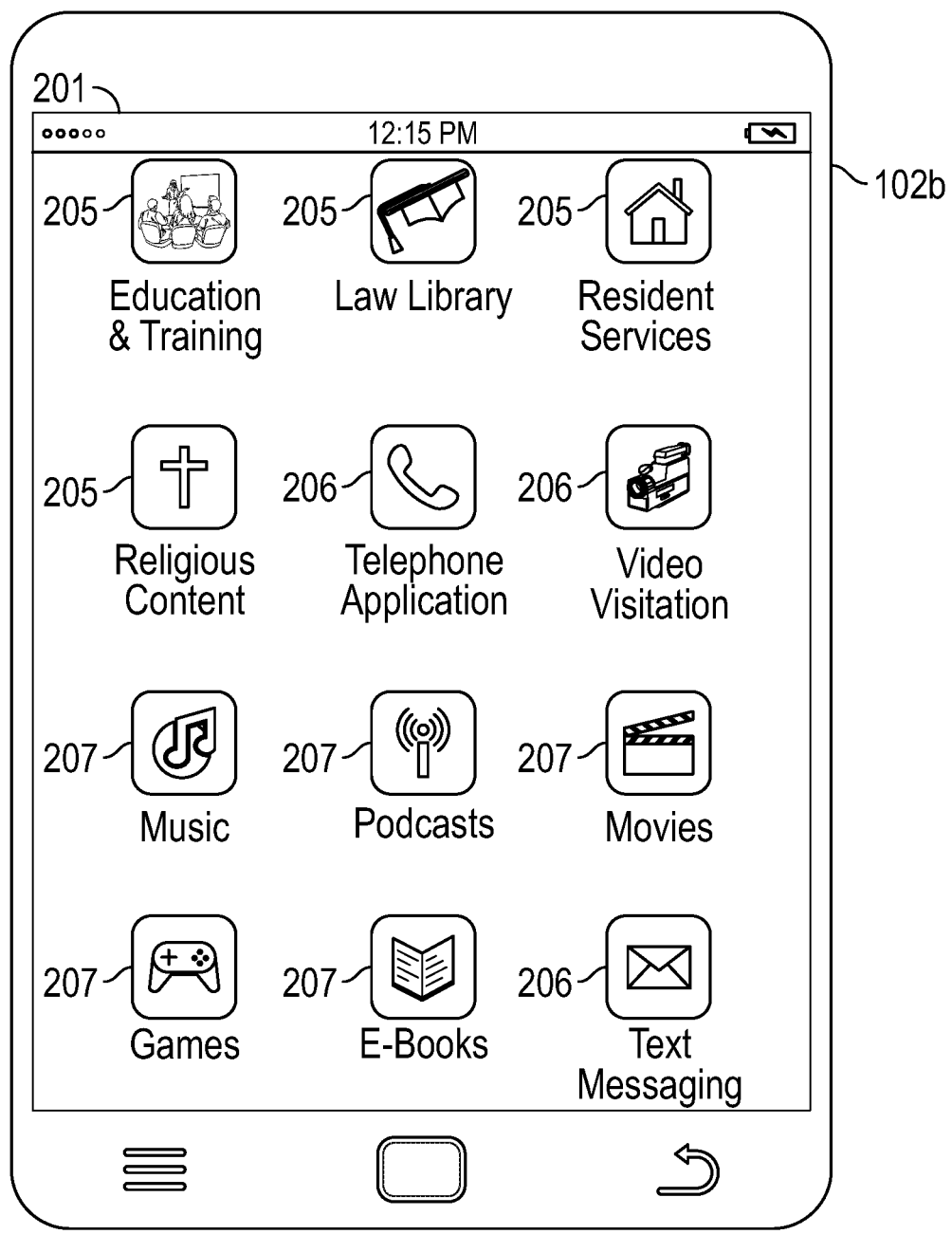
FIG. 2B illustrates an example embodiment of a personal media device.

FIG. 2B illustrates an example embodiment of a personal media device 102b that has been created from a community media device 102a (FIG. 2A). The user interface/display screen 201 may still present some of the original preloaded applications, such as education, research, resident services, and religious content applications 205. Additional applications are automatically downloaded and/or activated by the personalization application, such as communication applications 206 and entertainment applications 207. Personal media device 102b is also reconfigured by the personalization application to allow the user to save and access downloaded content, such as music, movies, courses, messages, etc.

Personal media device 102b is also permanently linked to purchasing resident by the personalization application. In one embodiment, a unique identifier for device 102b, such as a MAC address, device identifier, or application identifier, is linked to the resident's identity, log in credentials, or other account information. From that point on, the media device management server will only allow the purchasing resident to log in or access that personal media device 102b. Any other log in attempts by other residents will be blocked. The resident can also keep the device permanently and does not have to return it to the common stock or library of community devices.

The personalization application on the community media device allows residents to immediately obtain a personal media device without having to preorder such a device and wait for delivery from the commissary or other vendor. Once a device is converted from a community device to a personal device, the media device management server may notify the service provider that a new community media device should be added to the stock to replace the device that was taken out of general availability.

Figure 3:
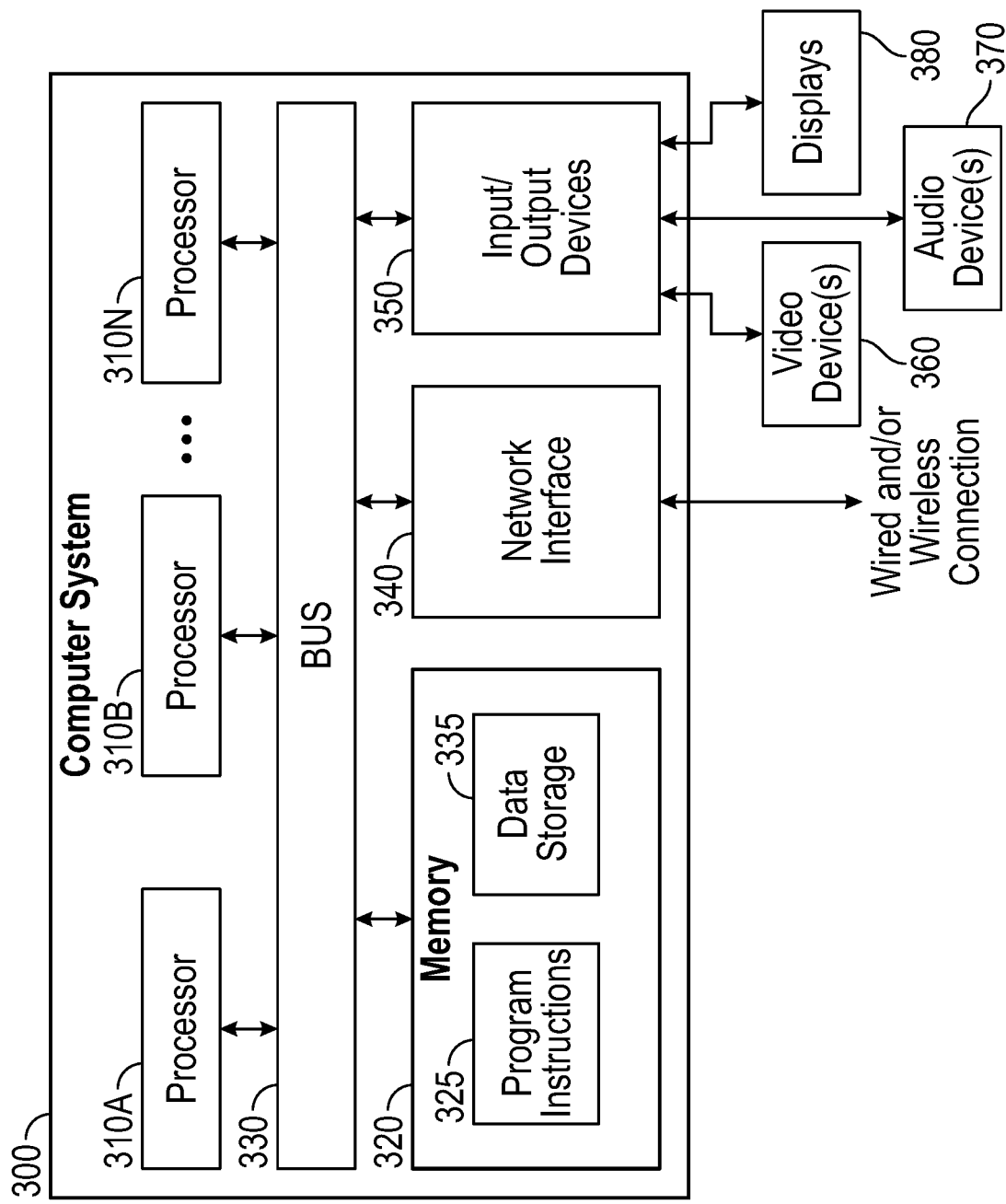
FIG. 3 is a block diagram of a computer system, device, station, or terminal configured to implement various techniques disclosed herein, according to some embodiments.

Some embodiments of the present systems and methods for converting a community media device to a personal media device, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer system 300 may implement one or more computer software programs. Computer system 300 may be used as, or as part of, one or more of media devices 102a, 102b, media device management server 108, kiosk 109.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as video devices 360, audio devices 370, display(s) 380, cursor control devices, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

In one embodiment, computer system 300 comprises at least one processor and a memory coupled to the at least one processor, the memory storing program instructions executable by the at least one processor 310 to cause the computer system to: enable a shared media device to present a personalization option on a user interface; upon selection of the personalization option by the user, enable the shared media device to verify that a specific user has authorization to personalize the device; if authorization is confirmed, enabling the shared media device to limit access so that only credentials for the user can be used to access the shared media device; and enable automatic download of additional content onto the shared media device. The authorization may comprise verifying that the user has sufficient funding and/or verifying that a third party has provided funding for the user. After selection of the personalization option, the automatically downloaded additional content may comprise a second set of applications that are only available on a personalized portable computing device. The additional content may comprise one or more of communication software applications and entertainment software applications.

Figure 4:
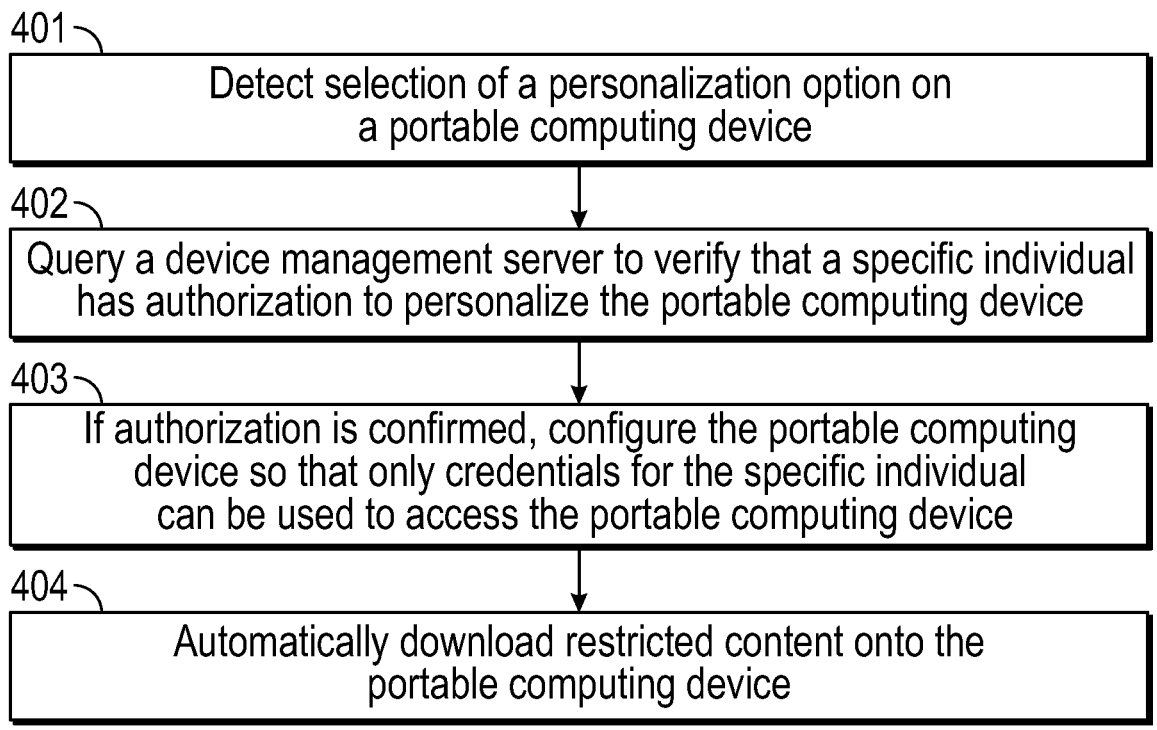
FIG. 4 is a flowchart illustrating a method for converting a community device to a personal device according to one embodiment.

FIG. 4 is a flowchart illustrating a method for converting a community device to a personal device according to one embodiment. In step 401, selection of a personalization option is detected on a portable computing device. In step 402, a device management server is queried to verify that a specific individual has authorization to personalize the portable computing device. The specific individual may be, for example, a user currently logged on to the portable computing device. The device management server may be remote from the portable computing device and may be queried, for example, through a network connection by a personalization application running on the portable computing device.

In step 403, if authorization for personalization of the portable computing device is confirmed, then the portable computing device is configured so that only credentials for the specific individual can be used to access the portable computing device. The authorization may comprise, for example, verifying that the specific individual has sufficient funding and/or verifying that a third party has provided funding for the specific individual.

In step 404, restricted content is automatically downloaded onto the portable computing device as part of or following the personalization process. In one embodiment, prior to selection of the personalization option, a first set of basic applications are available to any user of the portable computing device. The automatically downloaded restricted content may comprise a second set of applications that are only available on a personalized portable computing device and, therefore, not available to just any user of a portable computing device. The restricted content may comprise one or more of communication software applications and entertainment software applications.

Additionally, after selection of the personalization option, the portable computing device may be configured to store content that was blocked prior to personalization of the device. For example, the blocked content may be one or more of music, video, games, images, and messages. downloading, accessing, saving, or streaming movies, videos, images, music, podcasts, books, or other content.

Figure 5:
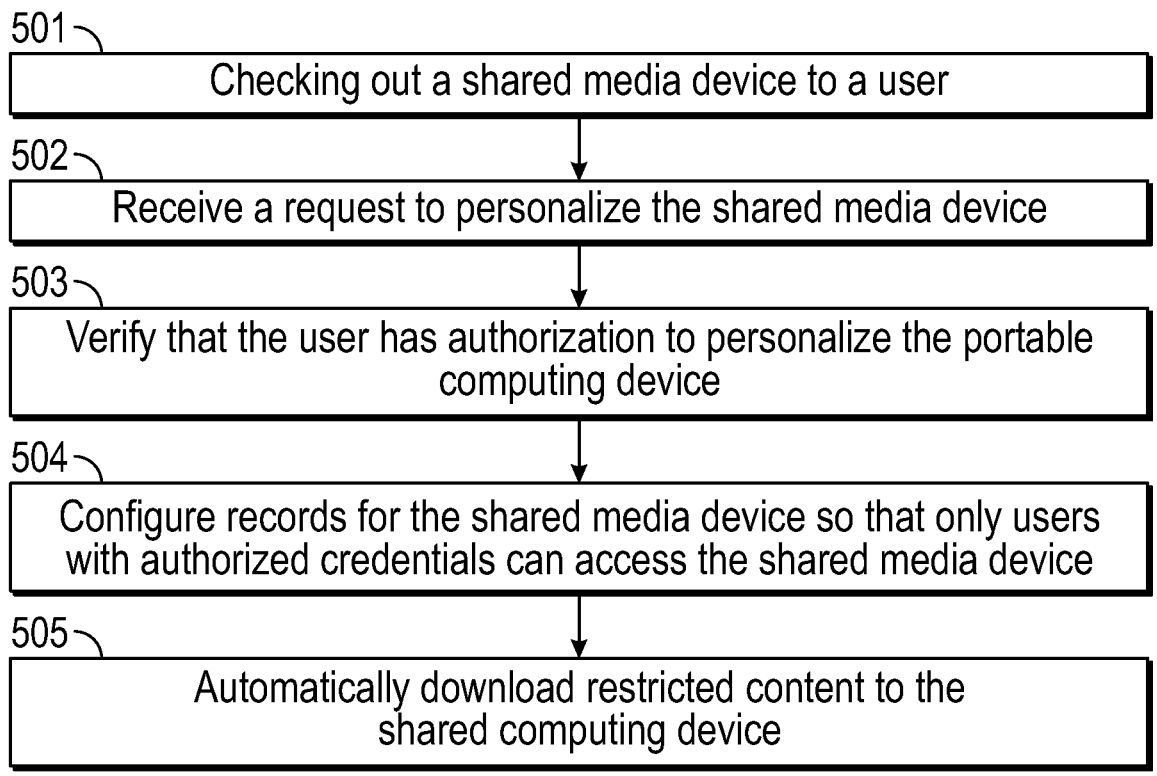
FIG. 5 is a flowchart illustrating a method for converting a community device to a personal device according to an additional embodiment.

FIG. 5 is a flowchart illustrating a method for converting a community device to a personal device according to an additional embodiment. The method may be performed on at least one computer system. In step 501, a shared media device is checked out to a user. A device management server may check out the devices to users. The device management server may be used to control access to a first set of shared media devices that are available to be checked out to a user in a group of users and to a second set of shared media devices that are each restricted to a specific user. Individual ones of the first set of shared media devices may become part of the second set of devices when a user purchases a device or purchases exclusive use of a device.

In step 502, a request to personalize the shared media device is received. In step 503, the user's authorization to personalize the portable computing device is verified. The shared media device may be personalized by limiting access to the shared media device to the user.

In step 504, records for the shared media device are configured so that only users with authorized credentials can access the shared media device. The authorized credentials that can access the shared media device may be, for example, log on credentials for the user.

In step 505, restricted content is automatically downloaded to the shared computing device. The shared media device may be used for communications after personalization. The communications may comprise one or more of: telephone calls, video visitation, text messages, email messages, and chat messages. The shared media device may be used for entertainment after personalization.

The various systems and methods illustrated in the figures and described herein represent example embodiments. The methods may be implemented in software, hardware, or a combination thereof. The order in which each operation of a given method is performed may be changed, and various elements of the systems or devices illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

The invention claimed is:

1. A method, comprising:
   detecting selection of a personalization option on a portable computing device;
   requesting authentication information from a first user of the portable computing device;
   authenticating the first user based on the authentication information;
   querying a device management server to verify that the first user is authorized to personalize the portable computing device;
   when the first user is authenticated and the user's authorization is confirmed, configuring the portable computing device so that only the first user with the first authentication information can be used to access the portable computing device and a second user with second authentication information is blocked from logging into the portable computing device;
   automatically downloading restricted content onto the portable computing device as a result of the authentication and authorization confirmation of the first user, wherein the automatically downloaded restricted content comprises a second set of applications that are only available on the personalized portable computing device;
   when the first user is not authenticated and authorized, allowing access to basic content by the first user, wherein the basic content comprises a first set of basic applications that were available to any user of the portable computing device prior to selection of the personalization option; and
   controlling access, by the device management server, to a first set of shared media devices that are available to be checked out to anyone in a group of users and to a second set of shared media devices that each are restricted to a specific user.

2. The method of claim 1, wherein the authorization comprises:
   verifying that the first user has sufficient funding.

3. The method of claim 1, wherein the authorization comprises:
   verifying that a third party has provided funding for the first user.

4. The method of claim 1, wherein the restricted content comprises one or more of communication software applications and entertainment software applications.

5. The method of claim 1, wherein, after selection of the personalization option, the portable computing device is configured to store content that was blocked prior to personalization of the device.

6. The method of claim 5, wherein the blocked content is one or more of music, video, games, images, and messages.

7. A method, comprising:
   operating at least one computer system comprising:
   checking out a shared media device to a first user;
   requesting first authentication information from the first user;
   authenticating the first user based on the first authentication information;
   receiving a request to personalize the shared media device;
   verifying that the first user has authorization to personalize the portable computing device;
   configuring records for the shared media device so that only the first user with the first authentication information can access the shared media device and a second user with second authentication information is blocked from logging into the shared media device;
   automatically downloading restricted content to the shared computing device as a result of the authentication and authorization verification of the first user, wherein the automatically downloaded restricted content comprises a second set of applications that are only available on the personalized portable computing device;
   when the first user is not authenticated and authorized, automatically downloading basic content to the shared computing device, wherein the basic content comprises a first set of basic applications that were available to any user of the portable computing device prior to selection of the personalization option; and
   controlling access, by a device management server, to a first set of shared media devices that are available to be checked out to anyone in a group of users and to a second set of shared media devices that each are restricted to a specific user.

8. The method of claim 7, wherein the authorized credentials that can access the shared media device are credentials for the first user.

9. The method of claim 7, wherein individual ones of the first set of shared media devices become part of the second set of devices when the specific user purchases a device or purchases exclusive use of a device.

10. The method of claim 7, further comprising:
personalizing the shared media device by limiting access to the shared media device to the first user; and
allowing the shared media device to be used for communications after personalization.

11. The method of claim 10, wherein the communications comprise one or more of: telephone calls, video visitation, text messages, email messages, and chat messages.

12. The method of claim 7, further comprising:
personalizing the shared media device by limiting access to the shared media device to the first user; and
allowing the shared media device to be used for entertainment after personalization.

13. A system, comprising:
a computer system comprising at least one processor and a memory coupled to the at least one processor, the memory storing program instructions executable by the at least one processor to cause the computer system to:
enable a shared media device to present a personalization option on a user interface;
request authentication information from a first user;
authenticate the first user based on the authentication information;
upon selection of the personalization option by the first user, enable the shared media device to verify that the first user has authorization to personalize the device;
when the first user is authenticated and the user's authorization is confirmed, configuring records for the shared media device so that only the first user with the first authentication information can access the shared media device and a second user with second authentication information is blocked from logging into the shared media device;
enable automatic download of additional content onto the shared media device as a result of the authentication and authorization confirmation of the first user, wherein the automatically downloaded additional content comprises a second set of applications that are only available on the personalized portable computing device;
when the first user is not authenticated and authorized, enable automatic download of basic content to the shared computing device, wherein the basic content comprises a first set of basic applications that were available to any user of the portable computing device prior to selection of the personalization option; and
control access to a first set of shared media devices that are available to be checked out to anyone in a group of users and to a second set of shared media devices that each are restricted to a specific user.

14. The system of claim 13, wherein the authorization comprises:
verifying that the first user has sufficient funding.

15. The system of claim 13, wherein the authorization comprises: verifying that a third party has provided funding for the first user.

16. The system of claim 13, wherein the additional content comprises one or more of communication software applications and entertainment software applications.

* * * * *